United States Patent
Baek et al.

(10) Patent No.: US 11,532,807 B2
(45) Date of Patent: *Dec. 20, 2022

(54) SPINEL-STRUCTURED LITHIUM MANGANESE-BASED POSITIVE ELECTRODE ACTIVE MATERIAL, AND POSITIVE ELECTRODE AND LITHIUM SECONDARY BATTERY WHICH INCLUDE THE POSITIVE ELECTRODE ACTIVE MATERIAL

(71) Applicant: LG Energy Solution, Ltd., Seoul (KR)

(72) Inventors: So Ra Baek, Daejeon (KR); Wang Mo Jung, Daejeon (KR); Min Suk Kang, Daejeon (KR); Sang Wook Lee, Daejeon (KR); Eun Sol Lho, Daejeon (KR); Wen Xiu Wang, Daejeon (KR)

(73) Assignee: LG Energy Solution, Ltd.

( * ) Notice: Subject to any disclaimer, the term of this patent is extended or adjusted under 35 U.S.C. 154(b) by 402 days.

This patent is subject to a terminal disclaimer.

(21) Appl. No.: 16/611,542

(22) PCT Filed: Nov. 6, 2018

(86) PCT No.: PCT/KR2018/013403
§ 371 (c)(1),
(2) Date: Nov. 7, 2019

(87) PCT Pub. No.: WO2019/088805
PCT Pub. Date: May 9, 2019

(65) Prior Publication Data
US 2020/0119341 A1  Apr. 16, 2020

(30) Foreign Application Priority Data

Nov. 6, 2017 (KR) .................. 10-2017-0146924
Nov. 6, 2018 (KR) .................. 10-2018-0135102

(51) Int. Cl.
*H01M 4/1315* (2010.01)
*H01M 4/525* (2010.01)
(Continued)

(52) U.S. Cl.
CPC .......... *H01M 4/1315* (2013.01); *C01G 51/42* (2013.01); *C01G 53/50* (2013.01); *H01M 4/131* (2013.01);
(Continued)

(58) Field of Classification Search
CPC .... H01M 4/1315; H01M 4/131; H01M 4/366; H01M 4/505; H01M 4/525; H01M 4/587;
(Continued)

(56) References Cited

U.S. PATENT DOCUMENTS 5,928,622 A    7/1999   Hwang et al.
6,746,800 B1 *   6/2004   Sunagawa ............. H01M 4/485
                                                               429/223
(Continued)

FOREIGN PATENT DOCUMENTS

CN        1595687 A      3/2005
CN    101047235 A    10/2007
(Continued)

OTHER PUBLICATIONS

Xiao et al., Atomic layer coating to mitigate capacity fading associated with manganese dissolution in lithium ion batteries, Electrochemistry Communications, vol./Issue 32, pp. 31-34 (Year: 2013).*
(Continued)

*Primary Examiner* — Jayne L Mershon
(74) *Attorney, Agent, or Firm* — Lerner, David, Littenberg, Krumholz & Mentlik, LLP (57) ABSTRACT

A spinel-structured lithium manganese-based positive electrode active material includes a lithium manganese oxide
(Continued)

represented by Formula 1, and a coating layer which is disposed on a surface of the lithium manganese oxide and includes at least one coating element selected from the group consisting of aluminum, titanium, tungsten, boron, fluorine, phosphorus, magnesium, nickel, cobalt, iron, chromium, vanadium, copper, calcium, zinc, zirconium, niobium, molybdenum, strontium, antimony, bismuth, silicon, and sulfur, and a positive electrode and a lithium secondary battery which include the positive electrode active material, $$Li_{1+a}Mn_{2-b}M^1{}_bO_{4-c}A_c \quad \text{[Formula 1]}$$

wherein, in Formula 1, $M^1$ is at least one metallic element including lithium (Li), A is at least one element selected from the group consisting of fluorine, chlorine, bromine, iodine, astatine, and sulfur, $0 \le a \le 0.2$, $0 < b \le 0.5$, and $0 \le c \le 0.1$.

13 Claims, 2 Drawing Sheets

(51) Int. Cl.
*H01M 4/131* (2010.01)
*H01M 4/36* (2006.01)
*H01M 4/505* (2010.01)
*H01M 4/587* (2010.01)
*H01M 4/62* (2006.01)
*H01M 10/0525* (2010.01)
*C01G 51/00* (2006.01)
*C01G 53/00* (2006.01)
*H01M 4/02* (2006.01)

(52) U.S. Cl.
CPC ............ *H01M 4/366* (2013.01); *H01M 4/505* (2013.01); *H01M 4/525* (2013.01); *H01M 4/587* (2013.01); *H01M 4/62* (2013.01); *H01M 10/0525* (2013.01); *C01P 2002/32* (2013.01); *C01P 2004/53* (2013.01); *C01P 2006/40* (2013.01); *H01M 2004/021* (2013.01); *H01M 2004/028* (2013.01)

(58) Field of Classification Search
CPC .... H01M 4/62; H01M 10/0525; C01G 51/42; C01G 53/50
See application file for complete search history.

(56) References Cited

U.S. PATENT DOCUMENTS

| | | | |
|---|---|---|---|
| 6,803,150 | B1 | 10/2004 | Iriyama et al. |
| 6,902,845 | B2 | 6/2005 | Tani et al. |
| 2001/0046628 | A1 | 11/2001 | Oesten et al. |
| 2003/0157407 | A1 | 8/2003 | Kosuzu et al. |
| 2006/0035151 | A1 | 2/2006 | Kumeuchi et al. |
| 2006/0263690 | A1 | 11/2006 | Suhara et al. |
| 2007/0190420 | A1 | 8/2007 | Ryu et al. |
| 2007/0248884 | A1 | 10/2007 | Tsuchiya |
| 2008/0070119 | A1* | 3/2008 | Miura ............ H01M 4/485 |
| | | | 429/231.95 |
| 2008/0131778 | A1* | 6/2008 | Watanabe ............ H01M 4/366 |
| | | | 427/126.6 |
| 2009/0017383 | A1 | 1/2009 | Suhara et al. |
| 2010/0012886 | A1 | 1/2010 | Ryu et al. |
| 2010/0294985 | A1 | 11/2010 | Suhara et al. |
| 2011/0217574 | A1 | 9/2011 | Toyama et al. |
| 2012/0009475 | A1 | 1/2012 | Nakura |
| 2012/0177986 | A1 | 7/2012 | Aida et al. |
| 2012/0177994 | A1 | 7/2012 | Kim et al. |
| 2013/0022872 | A1 | 1/2013 | Noh et al. |
| 2013/0302685 | A1 | 11/2013 | Kim et al. |
| 2014/0342230 | A1 | 11/2014 | Watanabe et al. |
| 2014/0363736 | A1 | 12/2014 | Kim et al. |
| 2015/0030928 | A1* | 1/2015 | Kwak ............ H01M 4/505 |
| | | | 264/618 |
| 2015/0037678 | A1 | 2/2015 | Kwak et al. |
| 2015/0357627 | A1 | 12/2015 | Kwak et al. |
| 2016/0006031 | A1 | 1/2016 | Kaseda et al. |
| 2016/0013480 | A1 | 1/2016 | Sikha et al. |
| 2016/0043395 | A1 | 2/2016 | Kawakami et al. |
| 2016/0079589 | A1 | 3/2016 | Ohara et al. |
| 2016/0329563 | A1 | 11/2016 | Oh et al. |
| 2017/0187041 | A1 | 6/2017 | Yamada et al. |
| 2018/0261842 | A1 | 9/2018 | Park et al. |
| 2018/0294477 | A1 | 10/2018 | Shin et al. |
| 2019/0140277 | A1 | 5/2019 | Dong et al. |
| 2019/0252675 | A1 | 8/2019 | Ohara et al. |

FOREIGN PATENT DOCUMENTS

| | | |
|---|---|---|
| CN | 102044671 A | 5/2011 |
| CN | 102054985 A | 5/2011 |
| CN | 102683669 A | 9/2012 |
| CN | 103633314 A | 3/2014 |
| CN | 103730654 A | 4/2014 |
| CN | 103794751 A | 5/2014 |
| CN | 104321912 A | 1/2015 |
| CN | 105870441 A | 8/2016 |
| CN | 105914361 A | 8/2016 |
| CN | 106953070 A | 7/2017 |
| EP | 3163656 A1 | 5/2017 |
| JP | 2000306577 A | 11/2000 |
| JP | 2000315503 A | 11/2000 |
| JP | 2003197192 A | 7/2003 |
| JP | 2006278322 A | 10/2006 |
| JP | 2008098142 A | 4/2008 |
| JP | 2009064574 A | 3/2009 |
| JP | 2010137996 A | 6/2010 |
| JP | 2011187193 A | 9/2011 |
| JP | 2011216214 A | 10/2011 |
| JP | 5213015 B2 | 6/2013 |
| JP | 2015527719 A | 9/2015 |
| KR | 20050030899 A | 3/2005 |
| KR | 20070021040 A | 2/2007 |
| KR | 20070114411 A | 12/2007 |
| KR | 20110081107 A | 7/2011 |
| KR | 20120081808 A | 7/2012 |
| KR | 20130002750 A | 1/2013 |
| KR | 20130117016 A | 10/2013 |
| KR | 20130125236 A | 11/2013 |
| KR | 20140013391 A | 2/2014 |
| KR | 20140095999 A | 8/2014 |
| KR | 20150013077 A | 2/2015 |
| KR | 20150028663 A | 3/2015 |
| KR | 20150040239 A | 4/2015 |
| KR | 20150043769 A | 4/2015 |
| KR | 20150135450 A | 12/2015 |
| KR | 20160026402 A | 3/2016 |
| KR | 20160084600 A | 7/2016 |
| KR | 20160094064 A | 8/2016 |
| KR | 101670664 B1 | 10/2016 |
| KR | 20170063396 A | 6/2017 |
| KR | 20170103184 A | 9/2017 |
| WO | 2004105162 A1 | 12/2004 |
| WO | 2013046711 A1 | 4/2013 |

OTHER PUBLICATIONS

International Search Report from Application No. PCT/KR2018/013405 dated Mar. 25, 2019, 2 pages.
International Search Report from Application No. PCT/KR2018/013403 dated Apr. 12, 2019, 3 pages.
Li et al., "Enhanced Elevated-Temperature Performance of Al-Doped LiMn2O4 as Cathodes for Lithium Ion Batteries", American Institute of Physics, AIP Conference Proceedings 1890, 040098, Oct. 2017, pp. 1-6.
Chinese Search Report for Application No. 201880027917.7 dated Dec. 2, 2021, 3 pages.
Chinese Search Report for Application No. 201880027952.9 dated Nov. 18, 2021, 2 pages.

(56) References Cited

OTHER PUBLICATIONS

Chinese Search Report for Application No. 201880066173.X dated Dec. 2, 2021, 2 pages.
Extended European Search Report including the Written Opinion for Application No. EP 18874163.1 dated Mar. 20, 2020, 8 pages.
Xiao et al., "Atomic layer coating to mitigate capacity fading associated with manganese dissolution in lithium ion batteries", Electrochemistry Communications, Elsevier, Amsterdam, NL, vol. 32, Mar. 28, 2013, pp. 31-34, XP028531633.
Extended European Search Report with Written Opinion for Application No. 18872343.1 dated Jul. 7, 2020, 7 pages.
International Search Report from Application No. PCT/KR2018/013411, dated Apr. 11, 2019, pp. 1-3.

* cited by examiner

SPINEL-STRUCTURED LITHIUM MANGANESE-BASED POSITIVE ELECTRODE ACTIVE MATERIAL, AND POSITIVE ELECTRODE AND LITHIUM SECONDARY BATTERY WHICH INCLUDE THE POSITIVE ELECTRODE ACTIVE MATERIAL

CROSS-REFERENCE TO RELATED APPLICATIONS

This application is a national phase entry under 35 U.S.C. § 371 of International Application No. PCT/KR2018/013403, filed Nov. 6, 2018, which claims priority to Korean Patent Application Nos. 10-2017-0146924, filed Nov. 6, 2017, and Korean Patent Application No. 10-2018-0135102, filed Nov. 6, 2018, the disclosures of which are incorporated herein by reference.

TECHNICAL FIELD

The present invention relates to a positive electrode active material for a lithium secondary battery, and a positive electrode and a lithium secondary battery which include the positive electrode active material. Specifically, the present invention relates to a spinel-structured lithium manganese-based positive electrode active material in which high-temperature storage characteristics and high-temperature life characteristics are excellent by improving Mn dissolution, and a positive electrode and a lithium secondary battery which include the positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high working voltage and excellent capacity characteristics has been mainly used. However, since the $LiCoO_2$ has very poor thermal properties due to an unstable crystal structure caused by delithiation and is expensive, there is a limitation in using a large amount of the $LiCoO_2$ as a power source for applications such as electric vehicles.

Lithium manganese-based oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, the lithium manganese-based oxide is advantageous in that its thermal stability and output characteristics are excellent and the price is low, but the lithium manganese-based oxide has limitations in that structural distortion (Jahn-Teller distortion) caused by $Mn^{3+}$ occurs during charge and discharge, and performance rapidly degrades because manganese (Mn) dissolution occurs due to HF formed by a reaction with an electrolyte solution at high temperature.

Thus, there is a need to develop a positive electrode active material in which a secondary battery having excellent high-temperature characteristics may be prepared at a low cost by suppressing the Mn dissolution of the lithium manganese-based oxide.

DISCLOSURE OF THE INVENTION

Technical Problem

An aspect of the present invention provides a spinel-structured lithium manganese-based positive electrode active material in which high-temperature storage characteristics and high-temperature life characteristics are excellent by suppressing the dissolution of manganese (Mn).

Another aspect of the present invention provides a positive electrode for a lithium secondary battery which may achieve excellent storage characteristics and life characteristics at high temperatures by including the positive electrode active material.

Another aspect of the present invention provides a lithium secondary battery in which high-temperature storage characteristics and high-temperature life characteristics are excellent by including the positive electrode according to the present invention.

Technical Solution

According to an aspect of the present invention, there is provided a spinel-structured lithium manganese-based positive electrode active material including: a lithium manganese oxide represented by Formula 1; and a coating layer which is disposed on a surface of the lithium manganese oxide and includes at least one coating element selected from the group consisting of aluminum (Al), titanium (Ti), tungsten (W), boron (B), fluorine (F), phosphorus (P), magnesium (Mg), nickel (Ni), cobalt (Co), iron (Fe), chromium (Cr), vanadium (V), copper (Cu), calcium (Ca), zinc (Zn), zirconium (Zr), niobium (Nb), molybdenum (Mo), strontium (Sr), antimony (Sb), bismuth (Bi), silicon (Si), and sulfur (S).

$$Li_{1+a}Mn_{2-b}M^1{}_bO_{4-c}A_c \qquad \text{[Formula 1]}$$

(in Formula 1, $M^1$ is at least one metallic element including lithium (Li), A is at least one element selected from the group consisting of F, chlorine (Cl), bromine (Br), iodine (I), astatine (At), and S, $0 \le a \le 0.2$, $0 \le b \le 0.5$, and $0 \le c \le 0.1$)

According to another aspect of the present invention, there is provided a positive electrode including a positive electrode collector, and a positive electrode active material layer formed on the positive electrode collector, wherein the positive electrode active material layer includes the spinel-structured lithium manganese-based positive electrode active material according to the present invention.

According to another aspect of the present invention, there is provided a lithium secondary battery including the positive electrode according to the present invention.

Advantageous Effects

According to the present invention, structural stability may be improved by doping a spinel-structured lithium manganese-based positive electrode active material with a doping element.

Also, since a contact between the positive electrode active material and an electrolyte solution is minimized by forming a coating layer on a surface of the spinel-structured lithium manganese-based positive electrode active material, manganese dissolution is suppressed at high temperatures, and, as a result, the spinel-structured lithium manganese-based positive electrode active material has better high-temperature storage characteristics and high-temperature life characteristics than a conventional positive electrode active material.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

An average particle diameter ($D_{50}$) in the present specification may be defined as a particle diameter at 50% in a cumulative particle diameter distribution, and may be measured by using a laser diffraction method. Specifically, with respect to the average particle diameter ($D_{50}$), after target particles are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle volume distribution of the measurement instrument may then be calculated.

In the present specification, inductively coupled plasma (ICP) analysis was performed using an inductively coupled plasma-optical emission spectrometer (ICP-OES) (OPTIMA 7300 DV, PerkinElmer Inc.).

In the present specification, a "specific surface area" was measured by a Brunauer-Emmett-Teller (BET) method, wherein, specifically, the specific surface area may be calculated from a nitrogen gas adsorption amount at a liquid nitrogen temperature (77 K) using BELSORP-mini II by Bell Japan Inc.

Also, in the present specification, the expression "%" denotes wt % unless otherwise specified.

Positive Electrode Active Material

First, a spinel-structured lithium manganese-based positive electrode active material according to the present invention will be described.

The lithium manganese-based positive electrode active material of the present invention is a spinel-structured positive electrode active material including a lithium manganese oxide represented by the following Formula 1 and a coating layer disposed on a surface of the lithium manganese oxide.

$$Li_{1+a}Mn_{2-b}M^1{}_bO_{4-c}A_c \qquad \text{[Formula 1]}$$

In Formula 1, $M^1$ is a doping element substituted at a manganese site in the lithium manganese oxide and may be at least one metallic element including lithium (Li). A is an element substituted at an oxygen site in the lithium manganese oxide and may be at least one element selected from the group consisting of fluorine (F), chlorine (Cl), bromine (Br), iodine (I), astatine (At), and sulfur (S).

1+a represents a molar ratio of lithium in the lithium manganese oxide, and a may satisfy 0≤a≤0.2, for example, 0≤a≤0.1.

b represents a molar ratio of the doping element $M^1$ in the lithium manganese oxide, and b may satisfy 0≤b≤0.5, for example, 0.03≤b≤0.25. In a case in which b, the molar ratio of $M^1$, satisfies the above range, a structurally stable positive electrode active material may be obtained while minimizing capacity reduction.

c represents a molar ratio of the element A in the lithium manganese oxide, and c may satisfy 0≤c≤0.1, for example, 0.01≤c≤0.05.

The lithium manganese oxide represented by Formula 1 is doped with the doping element $M^1$ having a lower oxidation number than manganese (Mn).

Since the lithium manganese oxide is doped with the doping element $M^1$ having a lower oxidation number than Mn, an average oxidation number of Mn ions is increased to reduce $Mn^{2-}$ formed by a disproportionation reaction ($2Mn^{3+}=Mn^{2+}+Mn^{4-}$) of Mn ions on a surface of an electrode during charge and discharge, and thus, Mn dissolution may be suppressed by inhibiting a reaction with HF formed in an electrolyte solution.

In the present invention, in a case in which the lithium manganese oxide is doped with an element having an oxidation number equal to or higher than Mn, the average oxidation number of Mn ions is reduced, and an amount of $Mn^{2-}$ due to the disproportionation reaction of the Mn ions is increased. After the $Mn^{2+}$ formed in this case is dissolved in an electrolyte, the $Mn^{2+}$ is reduced during charge and discharge to be deposited on a surface of a negative electrode, and thus, it may affect cell performance, for example, capacity degradation.

Also, the doping element $M^1$ may further include at least one metallic element selected from the group consisting of aluminum (Al), magnesium (Mg), zinc (Zn), boron (B), tungsten (W), nickel (Ni), cobalt (Co), iron (Fe), chromium (Cr), vanadium (V), ruthenium (Ru), copper (Cu), cadmium (Cd), silver (Ag), yttrium (Y), scandium (Sc), gallium (Ga), indium (In), arsenic (As), antimony (Sb), platinum (Pt), gold (Au), and silicon (Si). Preferably, the $M^1$ may include Li, and may further include at least one metallic element selected from the group consisting of Al and Mg.

Preferably, the lithium manganese oxide may be represented by Formula 1a below.

$$Li_{1+a}Mn_{2-b}Li_{b1}M^\alpha{}_{b2}O_{4-c}A_c \qquad \text{[Formula 1a]}$$

In Formula 1a, $M^\alpha$ is at least one metallic element selected from the group consisting of Al and Mg, 0≤a≤0.2, 0<b1+b2≤0.5, 0≤c≤0.1, and 0≤b1/b2≤1.3.

As in Formula 1, the doping element $M^1$ may preferably include Li and the metallic element represented by $M^\alpha$. In this case, b1 represents a molar ratio of Li as a doping element in the lithium manganese oxide, and b2 represents a molar ratio of the metallic element which may be further doped in addition to the Li in the lithium manganese oxide. b1+b2 represents the molar ratio of the doping element $M^1$ in the lithium manganese oxide, and b1+b2 may satisfy 0<b1+b2 0.5, for example, 0.03≤b1+b2 0.25. Also, a molar ratio of b1/b2 may satisfy 0≤b1/b2≤1.3, for example, $0.5 \leq b1/b2 \leq 1.2$. In a case in which the molar ratio, b1 and b2, of the doping element $M^1$ including Li and $M^a$ satisfies the above range, a structurally stable positive electrode active material may be obtained while minimizing capacity reduction.

Next, the coating layer is to prevent the dissolution of manganese (Mn) at high temperatures and suppress gas generation during charge and discharge by blocking a contact between the lithium manganese oxide and the electrolyte solution. The coating layer is disposed on the surface of the lithium manganese oxide and includes at least one element (hereinafter, referred to as 'coating element') selected from the group consisting of Al, titanium (Ti), W, boron (B), F, phosphorus (P), Mg, Ni, Co, Fe, Cr, V, Cu, calcium (Ca), Zn, zirconium (Zr), niobium (Nb), molybdenum (Mo), strontium (Sr), Sb, bismuth (Bi), Si, and S. The coating layer may preferably include at least one element selected from the group consisting of W, Mg, B, and Ti, and may more preferably include at least one element selected from the group consisting of W and B.

According to an embodiment, in the lithium manganese-based positive electrode active material according to the present invention, the doping element $M^1$ may be at least one metallic element including Li, Al, and Mg, and the coating layer may include $WO_3$.

According to another embodiment, in the lithium manganese-based positive electrode active material according to the present invention, the doping element $M^1$ may be at least one metallic element including Li, Al, and Mg, and the coating layer may include $B_2O_3$.

According to another embodiment, in the lithium manganese-based positive electrode active material according to the present invention, the doping element $M^1$ may be at least one metallic element including Li, Al, and Mg, and the coating layer may include $TiO_2$.

According to another embodiment, in the lithium manganese-based positive electrode active material according to the present invention, the doping element $M^1$ may be at least one metallic element including Li, Al, and Mg, and the coating layer may include $MgO_2$.

The spinel-structured lithium manganese-based positive electrode active material according to the present invention may include a lithium boron composite oxide and a lithium tungsten composite oxide.

For example, in the spinel-structured lithium manganese-based positive electrode active material, the lithium boron composite oxide and the lithium tungsten composite oxide may be present on a surface of the lithium manganese-based positive electrode active material. The lithium manganese-based positive electrode active material may preferably have a secondary particle, and more preferably, the lithium boron composite oxide and the lithium tungsten composite oxide may be present in the secondary particle and on the surface of the secondary particle.

The lithium boron composite oxide may be preferably lithium borate, more preferably lithium borate, lithium tetraborate, lithium pentaborate, and most preferably $Li_2B_4O_7$.

The lithium tungsten composite oxide may be preferably lithium tungstate and most preferably $Li_2WO_4$.

For example, during the preparation of the lithium manganese-based positive electrode active material, the lithium boron composite oxide and the lithium tungsten composite oxide may be formed on the lithium manganese-based positive electrode active material by mixing and sintering a boron raw material with raw materials including a lithium raw material, a manganese raw material, and a tungsten raw material. Since the lithium boron composite oxide and the lithium tungsten composite oxide are formed on the lithium manganese-based positive electrode active material, battery resistance may be reduced and manganese dissolution during high-temperature storage may be suppressed.

The coating layer may be continuously or discontinuously formed on the surface of the lithium manganese oxide represented by Formula 1.

For example, the coating layer may be formed in the form of islands in which particles including the coating elements are discontinuously attached to the surface of the lithium manganese oxide. In this case, the particles including the coating elements, for example, may be particles of oxides such as $WO_3$, $B_2O_3$, ZnO, $Al_2O_3$, $TiO_2$, MgO, CaO, $NbO_2$, SrO, CrO, $Mo_2O_5$, $Bi_2O_3$, and SiO. In a case in which the above-described oxide particles are present on the surface of the lithium manganese oxide, since the oxide particles capture and decompose HF formed by a reaction with the electrolyte solution as shown in Reaction Formula 1 below, the Mn dissolution due to the HF may be suppressed.

$$ZnO + 2Hf \rightarrow ZnF_2 + H_2O$$

$$Al_2O_3 + 6HF \rightarrow 2AlF_3 + 3H_2O \qquad \text{[Reaction Formula 1]}$$

Also, the coating layer may be formed in the form of a film including the coating elements on the surface of the lithium manganese oxide. In a case in which the coating layer is formed in the form of a film, an effect of blocking the contact between the electrolyte solution and the lithium manganese oxide and an effect of suppressing the manganese dissolution are better. Preferably, the film includes at least one element selected from the group consisting of W, Mg, B, and Ti. In a case in which the above-described film is formed on the surfaces of the lithium manganese oxide particles, a side reaction with the electrolyte solution and gas generation may be suppressed by blocking the contact with the electrolyte solution by the film.

The coating layer may be formed in an area corresponding to 50% to 100%, preferably 80% to 100%, and more preferably 90% to 100% of a total surface area of the lithium manganese oxide. In a case in which the coating layer formation area satisfies the above range, the contact between the electrolyte solution and the lithium manganese oxide may be effectively blocked.

Furthermore, the coating layer may have a thickness of 1 nm to 1,000 nm, for example, 1 nm to 100 nm or 10 nm to 1,000 nm. In the case that the coating layer is formed in the form of a film, the thickness may be in a range of 1 nm to 100 nm, and, in the case that coating layer is formed in the form of oxide particles, the thickness may be in a range of 10 nm to 1,000 nm. When the thickness of the coating layer satisfies the above range, the manganese dissolution and the occurrence of the side reaction with the electrolyte solution may be effectively suppressed while minimizing degradation of electrical performance.

The lithium manganese-based positive electrode active material of the present invention may include the doping element $M^1$ in an amount of 500 ppm to 40,000 ppm, preferably 2,500 ppm to 40,000 ppm, and more preferably 3,000 ppm to 40,000 ppm based on a total weight of the lithium manganese-based positive electrode active material. When the amount of the doping element $M^1$ satisfies the above range, the manganese dissolution at high temperatures is effectively suppressed, and, accordingly, a lithium secondary battery having excellent high-temperature storability may be achieved.

According to an embodiment, the lithium manganese-based positive electrode active material may include Li, or Li and Al and Mg, or a combination thereof, as a doping element, wherein the Al may be included in an amount of 2,500 ppm to 40,000 ppm, for example, 7,000 ppm to 20,000 ppm based on the total weight of the lithium manganese-based positive electrode active material, and the Li may be included in an amount of 500 ppm to 12,000 ppm, for example, 1,000 ppm to 3,000 ppm based on the total weight of the lithium manganese-based positive electrode active material. Also, the Mg may be included in an amount of 1,000 ppm to 20,000 ppm, for example, 3,000 ppm to 10,000 ppm based on the total weight of the lithium manganese-based positive electrode active material.

The lithium manganese-based positive electrode active material according to the present invention may have an average particle diameter ($D_{50}$) of 1 μm to 20 μm, for example, 1 μm to 8 μm, 7 μm to 20 μm, 8 μm to 20 μm, or 10 μm to 20 μm.

According to an embodiment, the lithium manganese-based positive electrode active material according to the present invention may have an average particle diameter ($D_{50}$) of 1 μm to 8 μm. With respect to the small particle-sized lithium manganese-based positive electrode active material having a small average particle diameter ($D_{50}$), since its surface area may be reduced in comparison to particles having a large average particle diameter by relatively increasing the amounts of the doping and coating elements and controlling sintering conditions, a lithium manganese-based positive electrode active material with excellent structural stability and less side reaction with the electrolyte solution may be prepared.

According to another embodiment, the lithium manganese-based positive electrode active material according to the present invention may have an average particle diameter ($D_{50}$) of 8 μm to 20 μm. With respect to the large particle-sized lithium manganese-based positive electrode active material having a large average particle diameter ($D_{50}$), it is advantageous in that the manganese dissolution is relatively smaller than that of the particles having a small average particle diameter.

Also, the lithium manganese-based active material may have a specific surface area of 0.1 $m^2/g$ to 1.5 $m^2/g$. The specific surface area may be adjusted according to the particle diameter of the lithium manganese-based active material, wherein, for example, in a case in which the lithium manganese-based active material is used in the form of small-sized particles in a positive electrode material to be described later, the specific surface area may be in a range of 0.5 $m^2/g$ to 1.5 $m^2/g$ or 0.7 $m^2/g$ to 1.1 $m^2/g$, and, in a case in which the lithium manganese-based active material is used in the form of large-sized particles, the specific surface area may be in a range of 0.1 $m^2/g$ to 1 $m^2/g$ or 0.25 $m^2/g$ to 0.7 $m^2/g$.

Also, the lithium manganese-based positive electrode active material may be in the form of a primary particle or a secondary particle formed by agglomeration of a plurality of primary particles. The secondary particle, for example, may be formed by agglomeration of the 2 to 100 or 2 to 50 primary particles.

Impurities that are unintentionally included in a preparation process may be included in the lithium manganese-based positive electrode active material. The impurities, for example, may include Fe, Ni, sodium (Na), Cu, Zn, Cr, Ca, potassium (K), S, Mg, Co, Si, B, or a combination thereof. In a case in which an amount of the impurities is large, dendrites on a negative electrode may be induced to reduce battery lifetime, and a low voltage failure due to an internal short circuit may occur. Also, the impurity, such as S, among these impurities has a limitation in that it corrodes an Al current collector. Thus, it is desirable that the impurity is controlled to a predetermined amount or less.

For example, the lithium manganese-based positive electrode active material according to the present invention may include the S impurity in an amount of 20,000 ppm or less, preferably 15,000 ppm or less, and more preferably 1,000 ppm or less, and may include the other impurities in an amount of 400 ppm or less and preferably 10 ppm or less.

Also, it is desirable that the lithium manganese-based positive electrode active material according to the present invention may include magnetic impurities, such as Fe, Cr, Ni, and Zn, among the above impurities in a total amount of 800 ppb or less, for example, 25 ppb or less. In a case in which the amount of the magnetic impurities exceeds the above range, the dendrites on the negative electrode may be induced to reduce the battery lifetime, or the low voltage failure due to the internal short circuit may occur.

Method of Preparing Positive Electrode Active Material

Next, a method of preparing the lithium manganese-based positive electrode active material according to the present invention will be described.

The lithium manganese-based positive electrode active material according to the present invention may be prepared by the steps of: forming a $M^1$-doped lithium manganese oxide represented by Formula 1, and mixing the lithium manganese oxide represented by Formula 1 with a coating raw material and performing a heat treatment to form a coating layer. Hereinafter, each step of the preparation method according to the present invention will be described in detail.

(1) $M^1$-doped Lithium Manganese Oxide Forming Step

The $M^1$-doped lithium manganese oxide represented by Formula 1 may be prepared by (i) a method of mixing a manganese raw material, a doping raw material including $M^1$, and a lithium raw material, and sintering the mixture, or (ii) a method of forming a $M^1$-doped manganese precursor by reacting a manganese raw material with a doping raw material including $M^1$, mixing the $M^1$-doped manganese precursor with a lithium raw material, and sintering the mixture. That is, in the present invention, the doping element $M^1$ may be added in the forming of the manganese precursor, or may be added in the sintering of the manganese raw material and the lithium raw material.

In this case, the manganese raw material may be a manganese element-containing oxide, hydroxide, oxyhydroxide, carbonate, sulfate, halide, sulfide, acetate, or carboxylate, or a combination thereof, and may specifically be $MnO_2$, $MnCl_2$, $MnCO_3$, $Mn_3O_4$, $MnSO_4$, $Mn_2O_3$, or $Mn(NO_3)_2$, but the manganese raw material is not limited thereto.

The doping raw material including $M^1$ may be a $M^1$-containing oxide, hydroxide, oxyhydroxide, sulfate, carbonate, halide, sulfide, acetate, or carboxylate, or a combination thereof, and, for example, may be $Li(OH)$, $LiCO_3$, $Li_2O$, $Al_2(SO_4)_3$, $AlCl_3$, Al-isopropoxide, $AlNO_3$, $MgO$, $Mg(OH)_2$, $MgSO_4$, or $Mg(NO_3)_2$, but the doping raw material including $M^1$ is not limited thereto.

The lithium raw material may be a lithium-containing carbonate (e.g., lithium carbonate, etc.), hydrate (e.g., lithium hydroxide monohydrate ($LiOH \cdot H_2O$, etc.), hydroxide (e.g., lithium hydroxide, etc.), nitrate (e.g., lithium nitrate ($LiNO_3$), etc.), or chloride (e.g., lithium chloride (LiCl), etc.), but the lithium raw material is not limited thereto.

According to an embodiment, the lithium manganese oxide represented by Formula 1 may be prepared by mixing a manganese raw material, a doping raw material including $M^1$, and a lithium raw material, and then sintering the mixture (method (i)).

The manganese raw material, the doping raw material including $M^1$, and the lithium raw material may be mixed in amounts such that the molar ratios of Mn, $M^1$, and Li in Formula 1 may be satisfied.

Also, the mixing may be performed by solid-phase mixing or liquid-phase mixing. In a case in which each component is mixed by the solid-phase mixing, a sintering process may be performed without a separate drying process, and, in a case in which each component is mixed by the liquid-phase mixing, a sintering process is performed after the mixed components are spray-dried. In the case that the solid-phase mixing method is used, a small particle-sized lithium manganese oxide having a low specific surface area and an average particle diameter ($D_{50}$) of less than 8 μm, for example, 6 μm or less may be obtained. In contrast, in the case that the wet mixing method is used, a large particle-sized lithium manganese oxide having an average particle diameter ($D_{50}$ of 8 μm or more is generally obtained.

The sintering may be performed at 600° C. to 900° C., for example, 700° C. to 800° C., for 5 hours to 24 hours, for example, 10 hours to 15 hours.

For example, the sintering may be performed at 750° C. to 850° C., for example, 780° C. to 830° C., for 5 hours to 24 hours, for example, 10 hours to 15 hours. In a case in which the above temperature and sintering time are satisfied, over sintering occurs to increase the size of primary particles, and, accordingly, a lithium manganese oxide having an average particle diameter ($D_{50}$) of the primary particles of 1 μm or more, for example, 2 μm to 3 μm may be obtained.

According to another embodiment, the lithium manganese oxide represented by Formula 1 may be prepared by forming a $M^1$-doped manganese precursor by reacting a manganese raw material with a doping raw material including $M^1$, mixing the $M^1$-doped manganese precursor with a lithium raw material, and sintering the mixture (method (ii)).

Specifically, the $M^1$-doped manganese precursor, for example, may be formed by a co-precipitation reaction of a manganese raw material with a doping raw material including $M^1$. The manganese raw material and the doping raw material including $M^1$ are the same as those described above.

The co-precipitation reaction may be performed by a co-precipitation method well known in the art, and, for example, the co-precipitation reaction may be performed in such a manner that the manganese raw material and the doping raw material are introduced into a co-precipitation reactor at an appropriate ratio, and the reaction is performed while an aqueous ammonia solution, as a complexing agent, and an aqueous alkaline solution, as a pH adjuster, are introduced.

When the $M^1$-doped manganese precursor is formed by the above-described co-precipitation reaction, the $M^1$-doped manganese precursor and a lithium raw material are mixed and then sintered to form a lithium manganese oxide.

The $M^1$-doped manganese precursor and the lithium raw material may be mixed in amounts such that the molar ratios of Mn, $M^1$, and Li in Formula 1 may be satisfied.

The mixing and the sintering may be performed by the same methods as those described in the method (i).

(2) Coating Layer Forming Step

When the $M^1$-doped lithium manganese oxide represented by Formula 1 is prepared by the above-described method, a coating layer including at least one element (hereinafter, referred to as a 'coating element') selected from the group consisting of Al, Ti, W, B, F, P, Mg, Ni, Co, Fe, Cr, V, Cu, Ca, Zn, Zr, Nb, Mo, Sr, Sb, Bi, Si, and S is formed on a surface of the lithium manganese oxide of Formula 1.

A method known in the art may be used for the formation of the coating layer, and, for example, a wet coating method, a dry coating method, a plasma coating method, or atomic layer deposition (ALD) may be used.

The wet coating method, for example, may be performed in such a manner that an appropriate solvent, such as ethanol, water, methanol, or acetone, is added to the lithium manganese oxide and a coating raw material, and then mixed until the solvent disappears.

The dry coating method is a method of solid-phase mixing the lithium manganese oxide and a coating raw material without a solvent, and, for example, a grinder mixing method or a mechanofusion method may be used.

The coating raw material may be an oxide, hydroxide, oxyhydroxide, carbonate, sulfate, halide, sulfide, acetate, or carboxylate, which includes at least one element (hereinafter, referred to as a 'coating element') selected from the group consisting of Al, Ti, W, B, F, P, Mg, Ni, Co, Fe, Cr, V, Cu, Ca, Zn, Zr, Nb, Mo, Sr, Sb, Bi, Si, and S, or a combination thereof, and, for example, may be ZnO, $Al_2O_3$, $Al(OH)_3$, $Al_2(SO_4)_3$, $AlCl_3$, Al-isopropoxide, $AlNO_3$, $TiO_2$, $WO_3$, AlF, $H_2BO_3$, $HBO_2$, $H_3BO_3$, $H_2B_4O_7$, $B_2O_3$, $C_6H_5B(OH)_2$, $(C_6H_5O)_3B$, $(CH_3(CH_2)_3O)_3B$, $C_3H_9B_3O_6$, $(C_3H_7O_3)B$, $Li_3WO_4$, $(NH_4)_{10}W_{12}O_{41} \cdot 5H_2O$, and $NH_4H_2PO_4$, but the coating raw material is not limited thereto.

After the coating raw material is attached to the surface of the lithium manganese oxide by the above-described method, a coating layer may be formed through a heat treatment. In this case, the heat treatment may be performed at 100° C. to 700° C., for example, 300° C. to 450° C., for 1 hour to 15 hours, for example, 3 hours to 8 hours.

Positive Electrode

Next, a positive electrode for a lithium secondary battery according to the present invention will be described.

The positive electrode according to the present invention includes a positive electrode collector, and a positive electrode active material layer formed on the positive electrode collector, wherein the positive electrode active material layer includes the spinel-structured lithium manganese-based positive electrode active material according to the present invention and includes a conductive agent and/or a binder, if necessary.

In this case, since the positive electrode active material is the same as described above, detailed descriptions thereof will be omitted, and the remaining configurations will be only described in detail below.

The positive electrode active material layer may further include a lithium nickel-cobalt-manganese-based positive electrode active material represented by Formula 2 below.

$$Li_{1+x}[Ni_yCo_zMn_wM^2_v]O_{2-p}B_p \qquad \text{[Formula 2]}$$

In Formula 2, $M^2$ is a doping element substituted at a transition metal (Ni, Co, Mn) site and may be at least one element selected from the group consisting of W, Cu, Fe, V, Cr, Ti, Zr, Zn, Al, In, Ta, Y, lanthanum (La), Sr, Ga, Sc, gadolinium (Gd), samarium (Sm), Ca, cerium (Ce), Nb, Mg, B, and Mo. Preferably, the $M^2$ may be at least one selected from the group consisting of Al, Zr, W, Ti, Nb, and B.

B is an element substituted at an oxygen site in the lithium nickel-cobalt-manganese-based positive electrode active material and may be at least one element selected from the group consisting of F, Cl, Br, I, At, and S.

1+x represents a molar ratio of lithium in the lithium nickel-cobalt-manganese-based positive electrode active material, and x may satisfy 0≤x≤0.3, preferably 0≤x≤0.2, and more preferably 0≤x≤0.1.

y represents a molar ratio of nickel in the lithium nickel-cobalt-manganese-based positive electrode active material, and y may satisfy 0.5≤y<1, preferably 0.65≤x<1, and more preferably 0.7≤y<1, for example, 0.75≤y<1.

z represents a molar ratio of cobalt in the lithium nickel-cobalt-manganese-based positive electrode active material, and z may satisfy 0<z<0.35 and preferably 0<z0.3.

w represents a molar ratio of manganese in the lithium nickel-cobalt-manganese-based positive electrode active material, and w may satisfy 0<w<0.35 and preferably 0<w≤0.3.

When the molar ratios, y, z, and w, of the transition metals in the lithium nickel-cobalt-manganese-based oxide satisfy the above ranges, a positive electrode active material having excellent energy density may be obtained.

v represents a molar ratio of the doping element $M^2$ in the lithium nickel-cobalt-manganese-based oxide, and v may satisfy 0≤v≤0.1, preferably 0.0005≤v≤0.08, and more preferably 0.001≤v≤0.02, for example, 0.002≤v≤0.01. When the molar ratio of the doping element $M^2$ in the lithium nickel-cobalt-manganese-based oxide satisfies the above range, a positive electrode active material having excellent high-temperature stability may be obtained.

p represents a molar ratio of the element B in the lithium nickel-cobalt-manganese-based oxide, and p may satisfy 0≤p≤0.1 and preferably 0≤p≤0.05.

Specifically, the lithium nickel-cobalt-manganese-based oxide represented by Formula 2 may be $Li_{1+x}[Ni_yCo_zMn_w]O_2$ or $Li_{1+x}[Ni_yCo_zMn_wAl_v]O_2$, but the lithium nickel-cobalt-manganese-based oxide represented by Formula 2 is not limited thereto.

The lithium nickel-cobalt-manganese-based positive electrode active material represented by Formula 2 may further include a coating layer including at least one coating element selected from the group consisting of Al, Ti, W, B, F, P, Mg, Ni, Co, Fe, Cr, V, Cu, Ca, Zn, Zr, Nb, Mo, Sr, Sb, Bi, Si, and S. For example, since a contact between the lithium nickel-cobalt-manganese-based positive electrode active material represented by Formula 2 and the electrolyte solution included in the lithium secondary battery is blocked by the coating layer to suppress the occurrence of a side reaction, life characteristics may be improved when used in the battery, and, in addition, packing density of the positive electrode active material may be increased.

In a case in which the coating element is further included as described above, an amount of the coating element in the coating layer may be in a range of 100 ppm to 10,000 ppm, for example, 200 ppm to 5,000 ppm based on a total weight of the lithium nickel-cobalt-manganese-based positive electrode active material represented by Formula 2. For example, in a case in which the coating element is included in an amount within the above range based on the total weight of the lithium nickel-cobalt-manganese-based positive electrode active material represented by Formula 2, the occurrence of the side reaction with the electrolyte solution may be more effectively suppressed and the life characteristics may be further improved when used in the battery.

The coating layer may be formed on an entire surface of the lithium nickel-cobalt-manganese-based positive electrode active material represented by Formula 2 and may be partially formed. Specifically, in a case in which the coating layer is partially formed on the surface of the lithium nickel-cobalt-manganese-based positive electrode active material represented by Formula 2, the coating layer may be formed in an area corresponding to 5% or more to less than 100%, for example, 20% or more to less than 100% of a total surface area of the lithium nickel-cobalt-manganese-based positive electrode active material represented by Formula 2.

The lithium nickel-cobalt-manganese-based positive electrode active material represented by Formula 2 may have an average particle diameter ($D_{50}$) of 1 μm to 20 μm, 2 μm to 10 μm, or 8 μm to 20 μm. In a case in which the average particle diameter ($D_{50}$) of the lithium nickel-cobalt-manganese-based positive electrode active material represented by Formula 2 satisfies the above range, excellent electrode density and energy density may be achieved.

The lithium nickel-cobalt-manganese-based positive electrode active material represented by Formula 2 may have a grain size of 200 nm to 500 nm. In a case in which the grain size of the lithium nickel-cobalt-manganese-based positive electrode active material represented by Formula 2 satisfies the above range, excellent electrode density and energy density may be achieved.

With respect to the lithium nickel-cobalt-manganese-based positive electrode active material represented by Formula 2, the amounts of the transition metals in the active material particles may be constant regardless of a position, or an amount of at least one metallic element may be changed depending on the position in the particle. For example, in the lithium nickel-cobalt-manganese-based positive electrode active material represented by Formula 2, at least one component of Ni, Mn, Co, and $M^2$ may have a gradually changing concentration gradient, and the expression "gradually changing concentration gradient" denotes that the components have concentration distributions in which the concentrations of the components are changed continuously and stepwise across the entire particle or in a specific region.

A commercially available lithium nickel-cobalt-manganese-based positive electrode active material may be purchased and used as the lithium nickel-cobalt-manganese-based positive electrode active material represented by Formula 2, or the lithium nickel-cobalt-manganese-based positive electrode active material represented by Formula 2 may be prepared by a method of preparing a lithium nickel-cobalt-manganese-based positive electrode active material which is known in the art.

For example, the lithium nickel-cobalt-manganese-based positive electrode active material represented by Formula 2 may be prepared by a method in which a nickel-cobalt-manganese-based precursor and a lithium raw material as well as selectively a doping raw material are mixed and then sintered.

The nickel-cobalt-manganese-based precursor may be a hydroxide, oxyhydroxide, carbonate, or organic complex of nickel-manganese-cobalt, or a hydroxide, oxyhydroxide, carbonate, or organic complex of nickel-manganese-cobalt which includes the doping element $M^2$. For example, the nickel-cobalt-manganese-based precursor may be $[Ni_yCo_zMn_w](OH)_2$, $[Ni_yCo_zMn_wAl_v](OH)_2$, $[Ni_yCo_zMn_w]O.OH$, or $[Ni_yCo_zMn_wAl_v]O.OH$, but the nickel-cobalt-manganese-based precursor is not limited thereto.

The lithium raw material may be a lithium-containing carbonate (e.g., lithium carbonate, etc.), hydrate (e.g., lithium hydroxide monohydrate ($LiOH.H_2O$, etc.), hydroxide (e.g., lithium hydroxide, etc.), nitrate (e.g., lithium nitrate ($LiNO_3$), etc.), or chloride (e.g., lithium chloride (LiCl), etc.), but the lithium raw material is not limited thereto.

The doping raw material may be an oxide, hydroxide, sulfide, oxyhydroxide, or halide, which includes at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, or a mixture thereof, The sintering may be performed at 600° C. to 1,000° C., for example, 700° C. to 900° C., for 5 hours to 30 hours, for example, 10 hours to 20 hours.

In a case in which the lithium nickel-cobalt-manganese-based positive electrode active material represented by Formula 2 includes a coating layer, a process may be further performed in which a coating raw material is added and mixed after the sintering and a heat treatment is then performed.

The coating raw material may be an oxide, hydroxide, oxyhydroxide, carbonate, sulfate, halide, sulfide, acetate, or carboxylate, which includes at least one element (hereinafter, referred to as a 'coating element') selected from the group consisting of Al, Ti, W, B, F, P, Mg, Ni, Co, Fe, Cr, V, Cu, Ca, Zn, Zr, Nb, Mo, Sr, Sb, Bi, Si, and S, or a combination thereof, and, for example, may be $ZnO$, $Al_2O_3$, $Al(OH)_3$, $Al_2(SO_4)_3$, $AlCl_3$, Al-isopropoxide, $AlNO_3$, $TiO_2$, $WO_3$, $AlF$, $H_2BO_3$, $HBO_2$, $H_3BO_3$, $H_2B_4O_7$, $B_2O_3$, $C_6H_5B(OH)_2$, $(C_6H_5O)_3B$, $(CH_3(CH_2)_3O)_3B$, $C_3H_9B_3O_6$, $(C_3H_7O_3)B$, $Li_3WO_4$, $(NH_4)_{10}W_{12}O_1 \cdot 5H_2O$, and $NH_4H_2PO_4$, but the coating raw material is not limited thereto.

A method known in the art may be used for the formation of the coating layer, and, for example, a wet coating method, a dry coating method, a plasma coating method, or atomic layer deposition (ALD) may be used.

The heat treatment may be performed at 100° C. to 700° C., for example, 300° C. to 450° C., for 1 hour to 15 hours, for example, 3 hours to 8 hours.

The lithium nickel-cobalt-manganese-based positive electrode active material represented by Formula 2 is a high-nickel positive electrode active material in which a nickel ratio is greater than 50 mol %, wherein energy density characteristics are excellent. Thus, in a case in which the lithium nickel-cobalt-manganese-based positive electrode active material represented by Formula 2 and the spinel-structured lithium manganese-based positive electrode active material of the present invention are mixed and used, a capacity problem, a disadvantage of the lithium manganese-based positive electrode active material, may be solved.

A positive electrode material including the lithium manganese-based positive electrode active material and the lithium nickel-cobalt-manganese-based positive electrode active material may have a bimodal particle diameter distribution in which large-sized particles having an average particle diameter ($D_{50}$) of 4 μm to 20 μm and small-sized particles having an average particle diameter ($D_{50}$) corresponding to 10% to 75%, for example, 25% to 75% of the average particle diameter ($D_{50}$ of the large-sized particles are included. In a case in which the positive electrode material having a bimodal particle diameter distribution is used as described above, a positive electrode having high electrode density and energy density may be formed.

Preferably, the large-sized particles may have an average particle diameter ($D_{50}$ of 8 μm to 20 μm, 8 μm to 15 μm, or 12 μm to 20 μm, and the small-sized particles may have an average particle diameter ($D_{50}$ of 1 μm to 15 μm, 2 μm to 13 μm, 2 μm to 8 μm, or 4 μm to 13 μm.

According to an embodiment, the positive electrode material according to the present invention may have a bimodal particle diameter distribution in which large-sized particles having an average particle diameter of 8 μm to 15 μm and small-sized particles having an average particle diameter of 1 μm to 6 μm are included.

According to another embodiment, the positive electrode material according to the present invention may have a bimodal particle diameter distribution in which large-sized particles having an average particle diameter of 12 μm to 20 μm and small-sized particles having an average particle diameter of 4 μm to 13 μm are included.

Types of active materials constituting the small-sized particles and the large-sized particles are not particularly limited, but the active materials may be the lithium manganese-based positive electrode active material and/or the lithium nickel-cobalt-manganese-based positive electrode active material.

According to an embodiment, the lithium manganese-based positive electrode active material may constitute the large-sized particles and the lithium nickel-cobalt-manganese-based positive electrode active material may constitute the small-sized particles in the positive electrode material of the present invention. In this case, the lithium manganese-based positive electrode active material may have an average particle diameter ($D_{50}$) of 8 μm to 20 μm, for example, about 12 μm to 20 μm, and lithium nickel-cobalt-manganese-based positive electrode active material may have an average particle diameter ($D_{50}$ of 1 μm to 15 μm, for example, about 4 μm to 13 μm. In a case in which the lithium manganese-based positive electrode active material is used in the large-sized particles satisfying the above-described range, manganese dissolution from the lithium manganese-based positive electrode active material may be more effectively suppressed, and, as a result, high-temperature stability of the battery may be further improved.

According to another embodiment, the lithium manganese-based positive electrode active material may constitute the small-sized particles and the lithium nickel-cobalt-manganese-based positive electrode active material may constitute the large-sized particles in the positive electrode material of the present invention. In this case, the lithium manganese-based positive electrode active material may have an average particle diameter ($D_{50}$) of 1 μm to 15 μm, for example, about 1 μm to 8 μm, and the lithium nickel-cobalt-manganese-based positive electrode active material may have an average particle diameter ($D_{50}$) of 8 μm to 20 μm, for example, about 8 μm to 15 μm. In a case in which the lithium manganese-based positive electrode active material is used in the small-sized particles satisfying the above-described range, an amount of doping and/or coating of the lithium manganese-based positive electrode active material may be increased, and the side reaction with the electrolyte solution may be minimized by allowing to have a low BET value.

According to another embodiment, the positive electrode material of the present invention may have a bimodal particle diameter distribution in which at least one of the lithium manganese-based positive electrode active material and the lithium nickel-cobalt-manganese-based positive electrode active material includes the large-sized particles and the small-sized particles.

The positive electrode material may include the lithium manganese-based positive electrode active material and the lithium nickel-cobalt-manganese-based positive electrode active material in a weight ratio of 10:90 to 90:10, for example, 40:60 to 60:40. When the mixing ratio of the lithium manganese-based positive electrode active material to the lithium nickel-cobalt-manganese-based positive electrode active material satisfies the above range, an electrode having both excellent high-temperature storability and excellent capacity characteristics may be obtained.

The positive electrode active material may be included in an amount of 80 parts by weight to 99 parts by weight, for example, 85 parts by weight to 98.5 parts by weight based on 100 parts by weight of a total weight of the positive electrode active material layer. When the positive electrode active material is included in an amount within the above range, excellent capacity characteristics may be obtained.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 part by weight to 15 parts by weight based on 100 parts by weight of the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 part by weight to 15 parts by weight based on 100 parts by weight of the total weight of the positive electrode active material layer.

The positive electrode of the present invention may be prepared according to a typical method of preparing a positive electrode except that the above-described spinel-structured lithium manganese-based positive electrode active material is used. Specifically, a positive electrode material mixture, which is prepared by dissolving or dispersing the positive electrode active material as well as selectively the binder and/or the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the positive electrode material mixture may be adjusted to have an appropriate viscosity in consideration of a coating thickness of a slurry and manufacturing yield.

Also, as another method, the positive electrode may be prepared by casting the positive electrode material mixture on a separate support and then laminating a film separated from the support on the positive electrode collector.

Lithium Secondary Battery

Next, a lithium secondary battery according to the present invention will be described.

The lithium secondary battery of the present invention includes a positive electrode, a negative electrode, a separator disposed between the positive electrode and the negative electrode, and an electrolyte, wherein the positive electrode is the same as the above-described positive electrode according to the present invention. Thus, detailed descriptions of the positive electrode will be omitted and the remaining configurations will be only described below.

The negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to a negative electrode active material.

Various negative electrode active materials used in the art may be used as the negative electrode active material, and the negative electrode active material is not particularly limited. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

In the lithium secondary battery of the present invention, it is desirable to use a mixture of two or more kinds of carbon materials having particular specific surface areas as the negative electrode active material.

For example, the negative electrode active material may include natural graphite and soft carbon, and may specifically include natural graphite having a specific surface area (BET) of 2.5 $m^2/g$ to 4.0 $m^2/g$ and soft carbon having a specific surface area (BET) of 7 $m^2/g$ to 10 $m^2/g$. In a case in which the positive electrode according to the present invention and the negative electrode including the natural graphite and soft carbon, which satisfy the above specific surface areas, are combined and configured, high-temperature durability of the secondary battery may be more improved. The negative electrode active material layer may further include artificial graphite, if necessary, and, in this case, the artificial graphite may have a specific surface area (BET) of 0.1 $m^2/g$ to 1.2 $m^2/g$.

Specifically, the negative electrode active material layer may include 70 wt % to 95 wt % of natural graphite, 0 wt % to 25 wt % of artificial graphite, and 5 wt % to 30 wt % of soft carbon based on a total weight of the negative electrode active material.

Also, the negative electrode active material may include natural graphite and artificial graphite, and may specifically include natural graphite having a specific surface area (BET) of 2.5 $m^2/g$ to 4.0 $m^2/g$ and artificial graphite having a specific surface area (BET) of 0.1 $m^2/g$ to 1.2 $m^2/g$. The negative electrode active material layer may further include soft carbon, if necessary, and, in this case, the soft carbon may have a specific surface area (BET) of 7 $m^2/g$ to 10 $m^2/g$. Specifically, the negative electrode active material layer may include 10 wt % to 50 wt % of natural graphite, 50 wt % to 90 wt % of artificial graphite, and 0 wt % to 20 wt % of soft carbon based on the total weight of the negative electrode active material. In this case, since negative electrode rate capability is improved, a battery having excellent fast cell charging and resistance characteristics may be achieved.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

The negative electrode active material layer may have a single layer structure or may have a multilayer structure in which two or more layers are stacked. For example, the negative electrode may include a negative electrode collector, a first negative electrode active material layer formed on the negative electrode collector, and a second negative electrode active material layer formed on the first negative electrode active material layer, wherein the first negative electrode active material layer and the second negative electrode active material layer may have different compositions from each other.

For example, the first negative electrode active material layer may include natural graphite among all negative electrode active materials included in the first negative electrode active material layer in an amount of 5 wt % to 100 wt %, for example, 80 wt % to 100 wt %, and the second negative electrode active material layer may include soft carbon among all negative electrode active materials included in the second negative electrode active material layer in an amount of 15 wt % to 95 wt %, for example, 15 wt % to 65 wt %. When the negative electrode having the above structure is used, processability may be improved by an improvement in electrode adhesion, and a battery having excellent high-temperature storage characteristics as well as excellent fast charging performance and resistance performance may be prepared.

The negative electrode may have a loading amount of 300 $mg/25\ cm^2$ to 500 $mg/25\ cm^2$, for example, 300 $mg/25\ cm^2$ to 400 $mg/25\ cm^2$. When the loading amount of the negative electrode satisfies the above range, the process may be facilitated by ensuring sufficient electrode adhesion, a battery having excellent fast charging performance and resistance performance may be achieved, and energy density may be maximized.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, as the electrolyte used in the present invention, an organic liquid electrolyte, an inorganic liquid electrolyte, a solid polymer electrolyte, a gel-type polymer electrolyte, a solid inorganic electrolyte, or a molten-type inorganic electrolyte, which is usable in a lithium secondary battery, may be used, and the electrolyte is not particularly limited.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as Ra-CN (where Ra is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

Any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion. Specifically, the lithium salt may include a single material selected from the group consisting of LiCl, LiBr, LiI, $LiClO_4$, $LiBF_4$, $LiBloCl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, or a mixture of two or more thereof.

The lithium salt may be appropriately changed in a normally usable range, but may specifically be included in a concentration of 0.8M to 3 M, for example, 0.1 M to 2.5 M in the electrolyte solution.

In order to improve life characteristics of the battery, suppress the reduction in battery capacity, and improve discharge capacity of the battery, various additives may be used in the electrolyte, in addition to the electrolyte components.

Also, an additive may be further included in the electrolyte, if necessary. As the additive, for example, a haloalkylene carbonate-based compound such as difluoroethylene carbonate; or pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be included, and the additives may be used alone or as a mixture thereof. In this case, the additive may be included in an amount of 0.1 wt % to 5 wt % based on a total weight of the electrolyte.

The above-described lithium secondary battery according to the present invention may be suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Preparation Example 1

$MnSO_4$ and $Li_2CO_3$ were mixed in a weight ratio of 99:1, and $MnSO_4 \cdot 7H_2O$ including 2 M $Li_2CO_3$ was then prepared using distilled water subjected to $N_2$ purging. The prepared $MnSO_4 \cdot 7H_2O$ including $Li_2CO_3$ was introduced into a continuous stirred tank reactor (CSTR, product name: CSTR-L0, manufacturer: EMS Tech) at a rate of 250 mL/h. A pH value of the solution was maintained to be 10.5 using a pH meter and a controller while introducing a 40% sodium hydroxide aqueous solution, as an alkalizing agent, at a rate of 10 mL/h through a sodium hydroxide aqueous solution supply unit of the reactor and a 25% ammonia solution at a rate of 30 mL/h through an ammonia solution supply unit of the reactor. A temperature of the reactor was set to be 40° C., a retention time (RT) was controlled to be 10 hours, and stirring was performed at a speed of 1,200 rpm to precipitate as $Mn_3O_4$ including Li. After the reaction solution thus obtained was filtered through a filter and purified with distilled water, an additional process of drying was performed to prepare a Li-doped manganese precursor, $(Mn_{0.96}Li_{0.04})_3O_4$.

The above-prepared Li-doped manganese precursor and a lithium raw material, $Li_2CO_3$, were mixed in a molar ratio of 1:0.75 and then sintered at 810° C. for 14 hours to obtain a lithium manganese oxide, $LiL_{1.0}(Mn_{1.92}Li_{0.08})O_4$.

Preparation Example 2

$MnSO_4$, and $Li_2CO_3$ and $Al_2(SO_4)_3$, as doping elements, were mixed in a weight ratio of 95:0.5:4.5 to prepare a Li and Al-doped manganese precursor, $(Mn_{0.957}Li_{0.015}Al_{0.028})_3O_4$.

A process was performed in the same manner as in Preparation Example 1 except that the above-prepared Li and Al-doped manganese precursor and a lithium raw material were mixed and sintered to prepare a lithium manganese oxide, $Li(Mn_{1.914}Li_{0.06}Al_{0.056})O_4$.

Preparation Example 3

$MnSO_4$, and $Li_2CO_3$ and $MgSO_4$, as doping elements, were mixed in a weight ratio of 98:0.5:1.5 to prepare a Li and Mg-doped manganese precursor, $(Mn_{0.961}Li_{0.021}Mg_{0.018})_3O_4$.

A process was performed in the same manner as in Preparation Example 1 except that the above-prepared Li and Mg-doped manganese precursor and a lithium raw material were mixed and sintered to prepare a lithium manganese oxide, $Li(Mn_{1.922}Li_{0.042}Mg_{0.036})O_4$.

Preparation Example 4

$MnSO_4$, and $Li_2CO_3$, $Al_2(SO_4)_3$, and $MgSO_4$, as doping elements, were mixed in a weight ratio of 96.4:0.5:2.3:0.8 to prepare a Li, Al, and Mg-doped manganese precursor, $(Mn_{0.96}Li_{0.02}Al_{0.01}Mg_{0.01})_3O_4$.

A process was performed in the same manner as in Preparation Example 1 except that the above-prepared Li, Al, and Mg-doped manganese precursor and a lithium raw material were mixed and sintered to prepare a lithium manganese oxide, $Li(Mn_{1.92}Li_{0.04}Al_{0.02}Mg_{0.02})O_4$.

Preparation Example 5

$MgSO_4$, instead of $Li_2CO_3$, was used as a doping element to prepare a Mg-doped manganese precursor, $(Mn_{0.96}Mg_{0.04})_3O_4$.

A process was performed in the same manner as in Preparation Example 1 except that the above-prepared Mg-doped manganese precursor and a lithium raw material were mixed and sintered to prepare a lithium manganese oxide, $Li_{1.0}(Mn_{1.92}Mg_{0.08})O_4$.

Preparation Example 6

$Al_2(SO_4)_3$, instead of $Li_2CO_3$, was used as a doping element to prepare an Al-doped manganese precursor, $(Mn_{0.96}Al_{0.04})_3O_4$.

A process was performed in the same manner as in Preparation Example 1 except that the above-prepared Al-doped manganese precursor and a lithium raw material were mixed and sintered to prepare a lithium manganese oxide, $Li_{1.0}(Mn_{1.92}Al_{0.08})O_4$.

Example 1

5,000 ppm of $WO_3$ was added to 100 parts by weight of the lithium manganese oxide prepared by Preparation Example 1, mixed, and then sintered at 600° C. for 5 hours to obtain lithium manganese-based positive electrode active material A on which a coating layer including W was formed.

The positive electrode active material A, a carbon black conductive agent, and a PVdF binder were mixed in a weight ratio of 95:2.5:2.5 in an N-methylpyrrolidone solvent to prepare a positive electrode material mixture. An aluminum current collector was coated with the positive electrode material mixture, dried at 130° C., and then rolled to prepare a positive electrode, and a coin cell was prepared using the positive electrode.

Example 2

A coin cell was prepared in the same manner as in Example 1 except that 3,000 ppm of $H_3BO_3$ was added to 100 parts by weight of the lithium manganese oxide prepared by Preparation Example 1 and mixed.

Example 3

A coin cell was prepared in the same manner as in Example 1 except that the lithium manganese oxide prepared by Preparation Example 2 was used as a positive electrode active material.

Example 4

A coin cell was prepared in the same manner as in Example 1 except that the lithium manganese oxide prepared by Preparation Example 3 was used as a positive electrode active material.

Example 5

A coin cell was prepared in the same manner as in Example 1 except that the lithium manganese oxide prepared by Preparation Example 4 was used as a positive electrode active material.

Comparative Example 1

A coin cell was prepared in the same manner as in Example 1 except that the lithium manganese oxide prepared by Preparation Example 1 was used as a positive electrode active material.

Comparative Example 2

A coin cell was prepared in the same manner as in Example 1 except that the lithium manganese oxide prepared by Preparation Example 5 was used.

Comparative Example 3

A coin cell was prepared in the same manner as in Example 1 except that the lithium manganese oxide prepared by Preparation Example 6 was used.

Experimental Example 1

Manganese Dissolution Test

An amount of manganese dissolution of each of the coin cells prepared by Examples 1 to 5 and Comparative Examples 1 to 3 was measured. Specifically, each coin cell was charged and discharged once, and then fully discharged to 3.0 V. Subsequently, the coin cell was disassembled and kept sealed in 4 mL of an electrolyte solution for 4 weeks, and an amount of Mn dissolved in the electrolyte solution was measured by inductively coupled plasma (ICP) analysis. In this case, the electrolyte solution was prepared by dissolving 1 M LiPF$_6$ in an organic solvent, in which ethylene carbonate:dimethyl carbonate:diethyl carbonate were mixed in a volume ratio of 1:2:1, and mixing 2 wt % of vinylene carbonate therewith.

The measurement results are shown in Table 1 below.

TABLE 1

|  | Manganese dissolution amount (ppm) |
|---|---|
| Example 1 | 40 |
| Example 2 | 76 |
| Example 3 | 65 |
| Example 4 | 60 |
| Example 5 | 63 |
| Comparative Example 1 | 128 |
| Comparative Example 2 | 125 |
| Comparative Example 3 | 83 |

As illustrated in Table 1, the amounts of manganese dissolution in the lithium manganese oxides prepared in Examples 1 to 5 were significantly smaller than those of Comparative Examples 1 to 3.

Experimental Example 2

High-temperature Life Characteristics

Life characteristics at high temperature were measured for the coin cells prepared in Examples 1 to 5 and Comparative Examples 1 to 3.

Specifically, each of the lithium secondary batteries prepared in Examples 1 to 5 and Comparative Examples 1 to 3 was charged at a constant current of 1 C to 4.3 V at 45° C. and cut-off charged at 0.05 C. Subsequently, each lithium secondary battery was discharged at a constant current of 1 C to a voltage of 3 V.

The charging and discharging behaviors were set as one cycle, and, after this cycle was repeated 200 times, high-temperature (45° C.) life characteristics according to Examples 1 to 5 and Comparative Examples 1 to 3 were measured, and the results thereof are presented in Table 2 and FIG. 1 below.

TABLE 2

|  | Capacity retention (%) | Resistance increase rate (%) |
|---|---|---|
| Example 1 | 92.3 | 148 |
| Example 2 | 83.5 | 198 |
| Example 3 | 80.3 | 188 |
| Example 4 | 82.7 | 183 |
| Example 5 | 81.4 | 185 |
| Comparative Example 1 | 69.2 | 245 |
| Comparative Example 2 | 71.2 | 239 |
| Comparative Example 3 | 79.2 | 215 |

Figure 1:
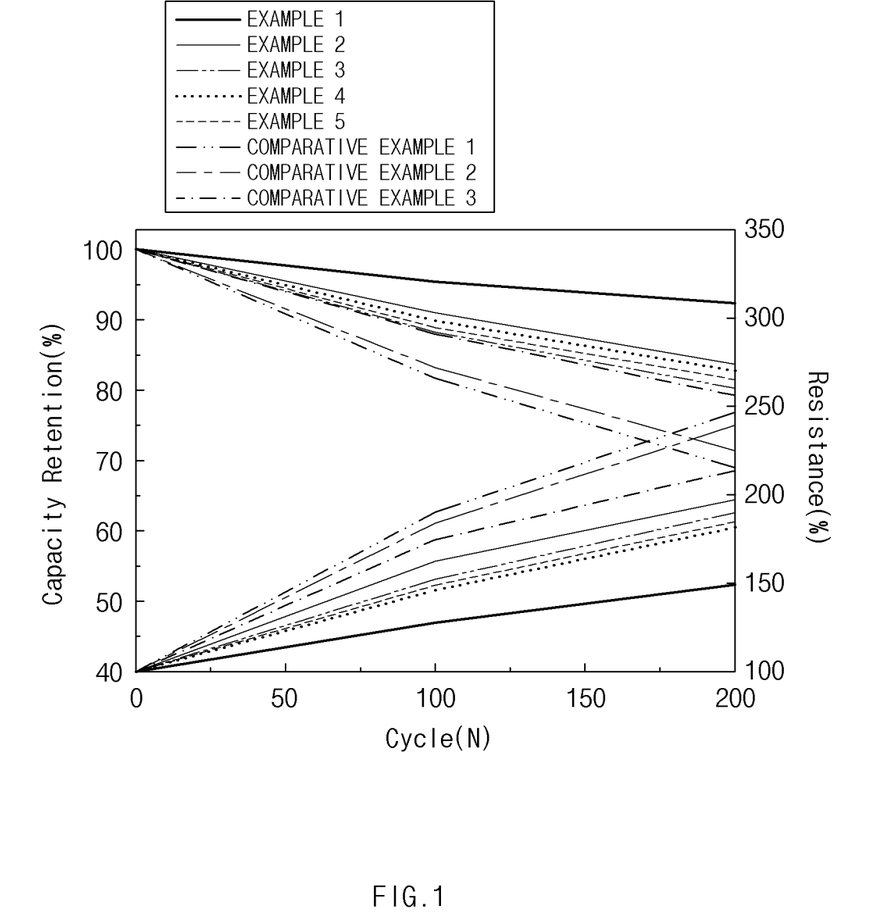
FIG. 1 is a graph illustrating capacity and resistance characteristics at a high temperature (45° C.) of secondary batteries prepared in Examples 1 to 5 and Comparative Examples 1 to 3 of the present invention according to cycles.

As illustrated in Table 2 and FIG. 1, with respect to the coin cells including the spinel-structured lithium manganese-based positive electrode active materials prepared in Examples 1 to 5, it may be confirmed that capacity retentions and resistance increase rates according to cycles at high temperature were significantly better than those of the coin cells including the lithium manganese-based positive electrode active materials prepared in Comparative Examples 1 to 3.

Experimental Example 3

High-temperature Storage Characteristics

Storage characteristics at high temperature were measured for the coin cells prepared in Examples 1 to 5 and Comparative Examples 1 to 3.

Specifically, each of the coin cells prepared in Examples 1 to 5 and Comparative Examples 1 to 3 was fully charged to 4.3 V and then stored at 60° C. for 4 weeks. Each coin cell was charged at a constant current of 0.1 C to 4.3 V and then discharged at a constant current of 0.1 C to a voltage of 3.0 V after every one week while being stored for 4 weeks, discharge capacity and resistance in this case were measured, and the results thereof are presented in Table 3 and FIG. 2 below.

TABLE 3

|  | Capacity retention (%) | Resistance increase rate (%) |
|---|---|---|
| Example 1 | 90.3 | 167 |
| Example 2 | 77.6 | 224 |
| Example 3 | 80.8 | 199 |
| Example 4 | 85.3 | 189 |
| Example 5 | 82.1 | 194 |
| Comparative Example 1 | 65.8 | 267 |
| Comparative Example 2 | 70.1 | 254 |
| Comparative Example 3 | 75.1 | 234 |

Figure 2:
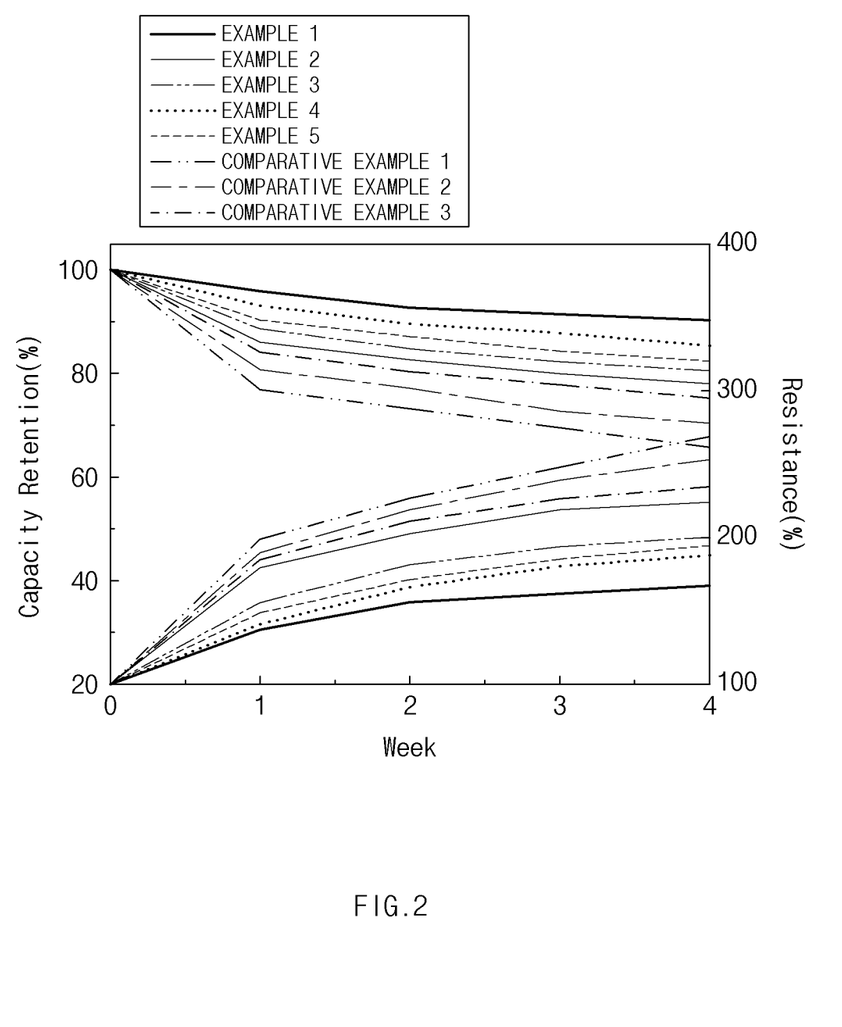
FIG. 2 is a graph illustrating capacity and resistance characteristics during high-temperature (60° C.) storage of the secondary batteries prepared in Examples 1 to 5 and Comparative Examples 1 to 3 of the present invention.

As illustrated in Table 3 and FIG. 2, with respect to the coin cells including the spinel-structured lithium manganese-based positive electrode active materials prepared in Examples 1 to 5, it may be confirmed that capacity retentions and resistance increase rates during storage for 4 weeks at a high temperature (60° C.) were significantly better than those of the coin cells including the lithium manganese-based positive electrode active materials prepared in Comparative Examples 1 to 3.

The invention claimed is:

1. A spinel-structured lithium manganese-based positive electrode active material comprising:
   a lithium manganese oxide represented by Formula 1; and
   a coating layer which is disposed on a surface of the lithium manganese oxide,
   wherein the coating layer includes:

$$Li_{1+a}Mn_{2-b}M^1{}_bO_{4-c}A_c \quad \text{[Formula 1]}$$

wherein, in Formula 1,
   M$^1$ is lithium (Li) and optionally at least one other metallic element, A is at least one element selected from the group consisting of F, chlorine (Cl), bromine (Br), iodine (I), astatine (At), and S, 0≤a≤0.2, 0<b≤0.5, and 0≤c≤0.1.

2. The spinel-structured lithium manganese-based positive electrode active material of claim 1, wherein the doping element M$^1$ further comprises at least one metallic element selected from the group consisting of Al, Mg, Zn, B, W, Ni, Co, Fe, Cr, V, ruthenium (Ru), Cu, cadmium (Cd), silver (Ag), yttrium (Y), scandium (Sc), gallium (Ga), indium (In), arsenic (As), Sb, platinum (Pt), gold (Au), and Si.

3. The spinel-structured lithium manganese-based positive electrode active material of claim 2, further comprising a lithium boron composite oxide and a lithium tungsten composite oxide.

4. The spinel-structured lithium manganese-based positive electrode active material of claim 1, wherein the doping element $M^1$ further comprises at least one metallic element selected from the group consisting of Al and Mg.

5. The spinel-structured lithium manganese-based positive electrode active material of claim 1, wherein the lithium manganese oxide is represented by Formula 1-1:

$$Li_{1+a}Mn_{2-b}Li_{b1}M^a{}_{b2}O_{4-c}A_c \qquad \text{[Formula 1-1]}$$

wherein, in Formula 1, $M^a$ is at least one metallic element selected from the group consisting of Al and Mg, $0 \le a \le 0.2$, $0 < b = b1+b2 \le 0.5$, $0 \le c \le 0.1$, and $0 \le b1/b2 \le 1.3$.

6. The spinel-structured lithium manganese-based positive electrode active material of claim 1, wherein the coating layer has a thickness of 1 nm to 1,000 nm.

7. The spinel-structured lithium manganese-based positive electrode active material of claim 1, wherein the lithium manganese-based positive electrode active material has an average particle diameter ($D_{50}$) of 1 μm to 20 μm.

8. The spinel-structured lithium manganese-based positive electrode active material of claim 1, wherein the lithium manganese-based positive electrode active material has a specific surface area of 0.1 m$^2$/g to 1.5 m$^2$/g.

9. The spinel-structured lithium manganese-based positive electrode active material of claim 1, wherein the lithium manganese-based positive electrode active material is in a form of a primary particle or a secondary particle formed by agglomeration of a plurality of primary particles.

10. The spinel-structured lithium manganese-based positive electrode active material of claim 9, wherein the secondary particle is formed by agglomeration of 2 to 50 primary particles.

11. A positive electrode comprising a positive electrode collector, and a positive electrode active material layer formed on the positive electrode collector,
wherein the positive electrode active material layer comprises the spinel-structured lithium manganese-based positive electrode active material of claim 1.

12. The positive electrode of claim 11, wherein the positive electrode active material layer further comprises a lithium nickel-cobalt-manganese-based positive electrode active material represented by Formula 2:

$$Li_{1+x}Ni_yCo_zMn_wM^2{}_vO_{2-p}B_p \qquad \text{[Formula 2]}$$

wherein, in Formula 2, $M^2$ is at least one element selected from the group consisting of tungsten (W), copper (Cu), iron (Fe), vanadium (V), chromium (Cr), titanium (Ti), zirconium (Zr), zinc (Zn), aluminum (Al), indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo), B is at least one element selected from the group consisting of fluorine (F), chlorine (Cl), bromine (Br), iodine (I), astatine (At), and sulfur (S), $0 \le x \le 0.3$, $0.50 \le y < 1$, $0 < z < 0.35$, $0 < w < 0.35$, $0 \le v \le 0.1$, and $0 \le p \le 0.1$.

13. A lithium secondary battery comprising the positive electrode of claim 11.

* * * * *